(12) United States Patent
Bynum

(10) Patent No.: US 6,247,884 B1
(45) Date of Patent: Jun. 19, 2001

(54) SELF-LOCKING THREADED PLUG

(75) Inventor: Kurt K. Bynum, Saline, MI (US)

(73) Assignee: Moeller Manufacturing Co., Wixom, MI (US)

( * ) Notice: Subject to any disclaimer, the term of this patent is extended or adjusted under 35 U.S.C. 154(b) by 0 days.

(21) Appl. No.: 09/607,258

(22) Filed: Jun. 30, 2000

Related U.S. Application Data
(60) Provisional application No. 60/142,319, filed on Jul. 2, 1999.

(51) Int. Cl.[7] .............................. F16B 39/22; F16B 39/34
(52) U.S. Cl. ......................... 411/304; 411/327; 411/947; 470/14
(58) Field of Search ..................................... 411/259, 302, 411/304, 324, 418, 420, 947; 470/12, 14

(56) References Cited

U.S. PATENT DOCUMENTS

| | | | |
|---|---|---|---|
| Re. 20,542 | * | 10/1937 | Dyer ...................................... 411/324 |
| 2,852,056 | * | 9/1958 | Rapata ................................... 411/304 |
| 5,879,116 | * | 3/1999 | Criswell ................................. 411/304 |

* cited by examiner

Primary Examiner—Neill Wilson
(74) Attorney, Agent, or Firm—James M. Deimen

(57) ABSTRACT

A new plug is formed with a diametrical slot in the interior threaded end and an axial through hole. A spring unit is positioned in the through hole and slot. The spring unit is formed with a diametral slot that extends from the interior end of the plug well down into the post portion of the spring unit and therefore into the through hole. The spring unit is assembled to the plug prior to heat treatment of the spring unit. Fixturing of the spring unit determines the spring rate of the unit and, in combination with the fit of the spring unit in the slot and through hole, the amount of live contact of the unit with the threads of the hole into which the plug is to be threaded. The holding torque of the plug is thereby determined. The new plug eliminates the present need for external capture devices or stainless steel wires through holes in the plug exterior in aircraft applications.

8 Claims, 1 Drawing Sheet

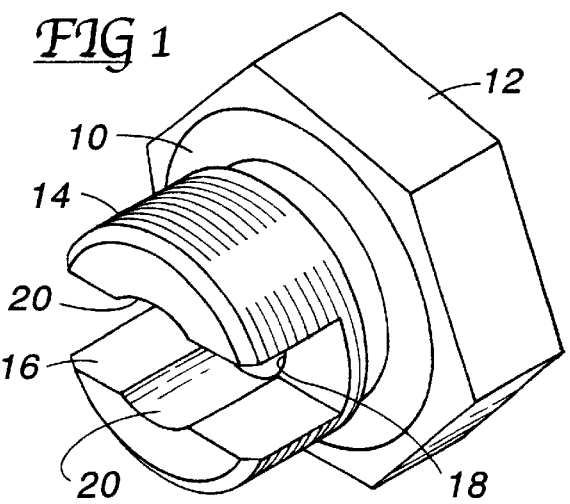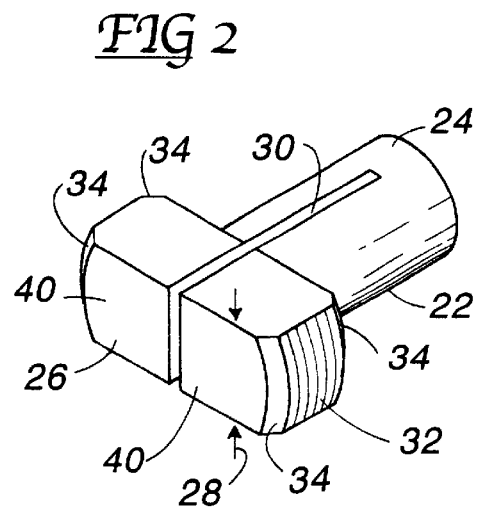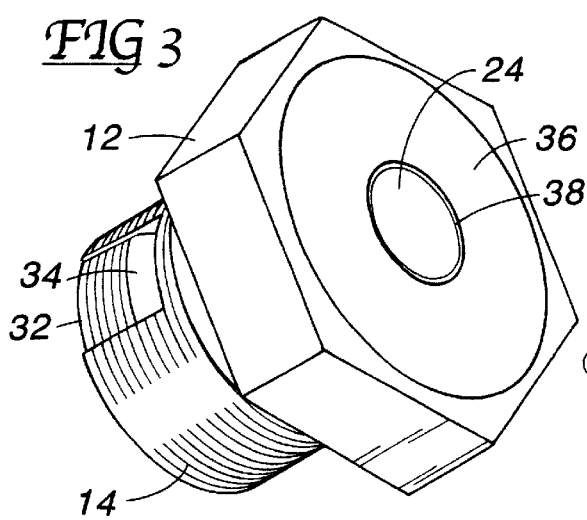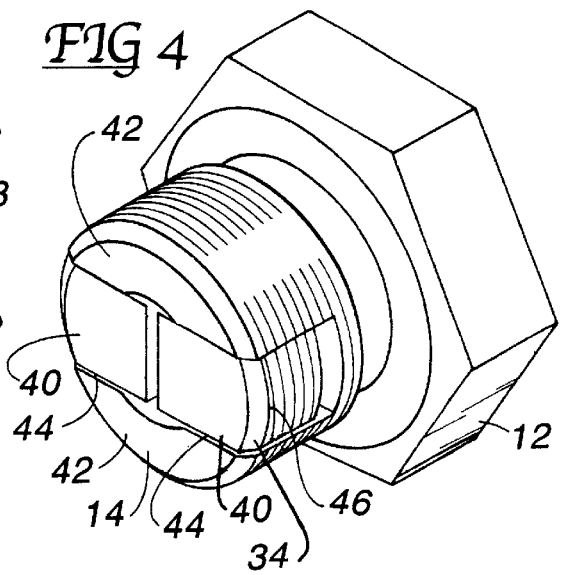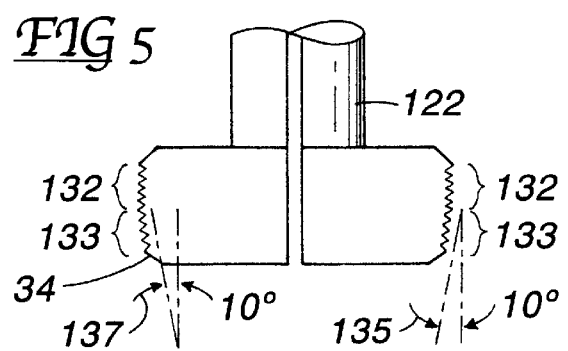

SELF-LOCKING THREADED PLUG

This application is a complete application based on provisional patent application Ser. No. 60/142,319 filed Jul. 2, 1999.

BACKGROUND OF THE INVENTION

The field of the invention pertains to threaded plugs for insertion in threaded boreholes such as the borescope holes formed in the metal casings of turbo-jet, fan-jet and other types of gas turbine engines used in aircraft. The borescope plugs, in particular those used in the hot section of the engine, must be corrosion resistant at high temperatures and not subject to loosening despite repeated temperature cycling when the engine is started and stopped. As a result, the borescope plugs are typically formed of high temperature refractory metal alloys that are difficult to form and therefore expensive to manufacture.

U.S. Pat. No. 2,166,686 discloses an adjusting screw for a camshaft follower. The screw is slotted and flatted at the end of the screw. The threads at the end of the screw are spaced by a relieved peripheral area from the remaining threads on the screw, and the lead of the end threads differs from the lead of the remaining threads.

U.S. Pat. No. 3,351,966 discloses a slotted fastener and method of manufacture of the threads to prevent the thread cutting or tapping effect adjacent the slot. The patent also discloses an enlarged thread area in the region of the slot to cause deformation when threaded into a threaded socket.

U.S. Pat. Nos. 4,815,276 and 5,115,636 disclose borescope plugs for double walled constructions, and U.S. Pat. No. 5,169,270 discloses a slotted plug wherein the slotted threaded portion is squeezed by the insertion tool when the plug is screwed into the threaded socket. Upon release of the tool, the plug expands to lock.

U.S. Pat. No. 5,704,748 discloses a screw having a recess intersecting the threads and a slot for a coil spring. The coil spring deflects upon mating with the threaded female member.

SUMMARY OF THE INVENTION

The new plug eliminates the present need for external capture devices or stainless steel wires through holes in the plug exterior in aircraft applications. The new plug is formed with a diametrical slot in the interior threaded end and an axial through hole. A spring unit is positioned in the through hole and slot. The spring unit is also formed with a diametrical slot that extends from the interior end of the plug well down into the post portion of the spring unit and therefore into the through hole.

The spring unit is assembled to the plug prior to heat treatment of the spring unit. Fixturing of the spring unit determines the spring rate of the unit and, in combination with the fit of the spring unit in the slot and through hole, the amount of line contact of the unit with the threads of the hole into which the plug is to be threaded. The holding torque of the plug is thereby determined.

Two alternative forms of the spring unit are disclosed. Both forms enable the plug to be easily initially threaded into the threaded borehole before the spring unit fully engages. In the first form, the spring unit is foreshortened to prevent engagement until the plug body is threaded in about a tenth of an inch or more. In the second form, the major, minor and pitch diameters are foreshortened to provide a non-standard tapered form thread as a lead-in thread that can be easily engaged by the threaded borehole.

BRIEF DESCRIPTION OF THE FIGURES

FIG. 1 is a perspective view of the plug body from the threaded end;

FIG. 2 is a perspective view of the spring unit from the threaded end;

FIG. 3 is a perspective view of the assembled plug from the head end;

FIG. 4 is a perspective view of the assembled plug from the threaded end; and

FIG. 5 is a partial cutaway view of an alternative form of the spring unit.

DESCRIPTION OF THE PREFERRED EMBODIMENT

Illustrated in FIG. 1 is a plug body 10 having a hexagonal head 12 and a generally cylindrical threaded end 14. The plug body 10 is manufactured from Type 347 Stainless Steel or another material that will not be deleteriously affected by the subsequent heat treat process. The threaded end 12 is formed with a diametrical slot 16, and the body 10 has an axial bore 18 therethrough. The diameter of the axial bore 18 at the head 12 end is substantially equal to the width of the slot 16, however, the bore 18 is counterbored 20 to a larger diameter at the threaded end 14 thus forming the depressions in the slot 16 wall at 20. The counterbore depth extends well into the head 12.

Illustrated in FIG. 2 is the spring unit 22 comprising a cylindrical end 24 having a diameter sized for a snug fit in the axial bore 18 in the head 12. The T-end 26 of the spring unit 22 has a width 28 substantially equal to the diameter of the cylindrical end 24 and slot 16 width, however, a few thousands inches of clearance is provided between the slot 16 width and the width 28 of the T-end 26. The spring unit 22 is formed with a slot 30 extending from the T-end 26 well down into the cylindrical end 24 as shown. The depth of the slot 30 approximates the depth of the counterbore 20 in the body 10. The T-end is also formed with threads 32 and chamfers 34 on otherwise cylindrical surfaces at the extremes of the T-end 26. The spring unit 22 can be manufactured from Inconel 718 or a similar material that can be machined to shape prior to the heat treatment necessary to harden the spring unit into an effective spring.

FIGS. 3 and 4 illustrate the assembled plug in perspective. The cylindrical end 24 of the spring unit 22 is substantially flush with the outside surface 36 of the head 12 and permanently welded or otherwise fastened to the head about the juncture at 38. With the spring unit 22 assembled to the plug body 10 the faces 40 of the T-end 26 lie below or behind the end surfaces 42 of the plug body as indicated at 44. By having the depressed faces 40, the threads 14 on the body 10 are allowed to engage the female threads of the borehole initially. Thus, the plug can thereby be easily started and partially threaded into the borehole before the spring unit 22 threads 32 engage and, as a result, require substantially more torque be applied to the plug head 12. Moreover, the plug is much less likely to be cross-threaded when started.

In manufacturing the plug, subsequent to the assembly above noted, the slot 30 is widened at the T-end 26 with a wedging fixture to provide the increased diameter desired for the T-end. The entire plug is then heat-treated to provide the spring rate desired in the spring unit 22. Thus, after initially threading the plug into a borehole the spring unit 22 threads 32 engage, compressing the spring unit 22 and thereby creating a substantial resistance to turning of the plug in the borehole as noted above.

In summary, the slotted portion of the spring unit 22 provides dual flexible cantilever beams. The slotted cylindrical portion diameter and slot depth principally determine the spring rate and therefore the torque that must be applied to fully seat the plug or loosen the plug.

The configuration of the spring unit provides for an extended cycle life. The tips 46 of the initial threads on the spring unit 22 just beyond the chamfers 34 initially contact the female threads of the borehole with the greatest force. With repeated cycling in an out of the borehole the threads with the highest initial contact force wear and new threads further along the spring unit 22 come into highest force contact with the borehole threads thus extending the useful cycle life of the plug.

In FIGS. 2 and 4 the preferred construction calls for a 20° chamfer 34 and depression of the faces 40 of about 0.100 to 0.125 inches behind the end surfaces 42 to allow the initial threading of the plug body 10 into the borehole. To assure line contact of the threads 32 on the spring unit 22 with the borehole threads, the spring unit cylindrical end 24 diameter and T-end 26 width 28 is 0.250 inches and the corresponding slot 16 width is 0.257 inches. This close but free fit minimizes twist of the spring unit 22 in the diametrical slot 16 to assure the line contact.

FIG. 5 illustrates an alternative form of the spring unit 122 wherein the thread 132 thereon is modified to provide a lead-in thread 133. The lead-in thread is a non-standard tapered form thread which tapers to a smaller diameter at the chamfer 34. With the spring unit 122 in its expanded condition the lead-in thread 133 at the chamfer 34 can easily be engaged in the borehole thread and a significant amount of further lead-in thread engaged before the spring unit begins to deform and increase the turning torque required to fully engage the plug in the borehole. Otherwise, it would be difficult to get the plug to initially engage without stripping or cross-threading the engagement.

As an example, for an –07 size borehole plug, the portion of the thread 132 on the spring unit 122 is threaded to a conventional 0.625-18 thread. The thread tapers to a lead-in thread 133 that is a non-conventional 0.585-18 thread. To obtain the desired torque for the locking plug, the spring unit 122 is wedged about 0.020 inches larger and heat treated as above providing a 0.645-18 tapering to a 0.605-18 thread.

In this example, the threads retain an 18 threads per inch pitch and a conventional 60° thread profile. Also, the straight thread at 132 transitions smoothly to the tapered thread 133 while maintaining a continuous pitch. The major, minor and pitch diameters taper on a 10° angle as indicated by the angles 135 and 137 in this example, but the thread flank angles remain 30° to the centerline axis of the thread.

In this example embodying the alternate form of the spring unit 122, the plug will start and engage about 1½ turns in the borehole until the tapered lead-in thread pitch diameter equals the thread pitch diameter of the mating plug and borehole. Then the spring unit 122 begins to generate an increasing amount of torque as the spring unit is squeezed to the borehole thread pitch diameter. Full torque is achieved once the lead-in thread 133 and straight thread 132 are both completely engaged in, and compressed by, the borehole thread. Normally, once the straight thread 132 is fully engaged, the tapered thread 133 will lose contact with the borehole thread.

What is claimed is:

1. A self locking threaded plug comprising a body having a threaded end and a head at the opposite end, an axial bore in the body and a spring unit affixed in the axial bore, a diametrical slot in the threaded end of the body and a bifurcated T-end on the spring unit extending into the diametrical slot, the bifurcation formed by a slot in the T-end extending into the axial bore beyond the T-end, a plurality of threads formed on the extreme ends of the T-end, the spring unit urging the maximum diameter of the threaded extreme ends beyond the maximum diameter of the body threaded end.

2. The self locking threaded plug of claim 1 wherein the spring unit end opposite the T-end is permanently affixed to the head of the body.

3. The self locking threaded plug of claim 1 wherein the threaded end of the body extends beyond the T-end of the spring unit.

4. The self locking threaded plug of claim 1 wherein the axial bore is counterbored from the threaded end of the body and the depth of the slot in the spring end is substantially equal to the counterbore depth.

5. The self locking threaded plug of claim 1 including chamfers formed on the extreme ends of the T-ends, the chamfers being depressed relative to the threaded end surfaces of the body.

6. The self locking threaded plug of claim 1 including lead-in threads forming a portion of the threads on the extreme ends of the T-end, said lead-in threads tapered to a lesser thread diameter in an axial direction toward the threaded end surfaces of the body.

7. A method of manufacturing a self locking threaded plug comprising the steps of:

forming a bore hole axially in a plug body having a threaded end and a head end, forming a diametrical slot in the threaded end intersecting the bore hole, forming a T-shaped spring unit having a bifurcated T-end with threads at the extreme ends of the T-end, assembling the spring unit to the plug body with the T-end in the diametrical slot, permanently attaching the spring unit to the plug body, expanding the T-end and heat-treating the assembled plug body and spring unit to develop the resilient spring rate desired in the spring unit.

8. The method of claim 7 including the step of forming a tapered form thread on the extreme ends of the T-end of the spring unit.

* * * * *